3,272,753
DETERGENT LIQUID

Harold Eugene Wixon, New Brunswick, N.J., assignor to Colgate-Palmolive Company, New York, N.Y., a corporation of Delaware
No Drawing. Filed Jan. 13, 1965, Ser. No. 425,331
9 Claims. (Cl. 252—137)

This is a continuation-in-part of copending application Serial No. 103,264 filed April 17, 1961, now abandoned.

The present invention relates to a pourable, homogeneous concentrated liquid detergent composition comprising an alkali metal higher alkyl aryl sulfonate detergent, sodium silicate and a sulfonated solubilizing or hydrotropic agent in an aqueous medium, as hereinafter described and claimed, said composition being substantially free from inorganic polyphosphate salts and effective as a heavy-duty detergent.

More particularly, the product is substantially free from said polyphosphate salts and comprises or consists essentially of about 7 to 22% by weight of alkali metal alkyl mononuclear aryl sulfonate detergent having an alkyl group of 8 to 15 carbon atoms, a proportion within the range of about 10 to 20% by weight of sodium silicate having a sodium oxide to silica ratio from the range of 1:1 to 1:2.5, effective as an inorganic builder salt sufficient to exhibit heavy-duty detergency in combination therewith, and about 5 to 12% by weight of an alkali metal sulfonated hydrotropic salt proportioned as described herein in water or equivalent aqueous solubilizing medium, said ingredients forming a pourable, homogeneous liquid stable upon aging.

A preferred embodiment relates to a composition containing about 15 to about 20% by weight of alkali metal higher alkyl benzene sulfonate detergent, and an effective amount up to about 15%, e.g. usually at least about 12%, by weight of sodium silicate having a sodium oxide to silica ratio of 1:1 to 1:2, preferably about 1:1.6, in an aqueous medium containing said sulfonated hydrotropic salt and a saturated aliphatic monohydric alcohol of 2 to 3 carbon atoms in an amount from about ¼ to 5% by weight, said ingredients forming a pourable, homogeneous clear liquid at room temperature. Various other distinctive aspects of the present invention will be apparent from the following description.

These liquid products exhibit many desirable properties. It has been found that the ingredients may be combined in the form of pourable, homogeneous liquids which are stable upon aging at usual room temperature, e.g., about 20° C. to 25° C., without the formation of immiscible layers or a precipitate. As a result, the consumer can utilize them conveniently by the addition of small portions to a dishpan or laundering bath, and the detergent and silicate builder salts will be present in constant composition in each portion. The compositions are reasonably stable at moderately adverse temperature conditions without separation into two or more immiscible layers. In general, the products become more viscous at reduced temperatures and ultimately tend to form a solid or semi-solid mass. It has been found however that the silicate is not separated and crystallized to any significant extent from such products which return to a pourable, homogeneous, clear liquid condition upon being maintained at room temperature. Upon excessive heating, the products may separate into several phases which also return to a clear, homogeneous form at room temperature. Liquid products containing the above ingredients may be prepared by proper formulation so as to be clear at temperatures ranging from about 40° F. to 120° F. The liquid may be employed in any suitable container or packaging material such as metal, plastic or glass in the form of bottles, bags, cans, drums, etc.

These homogeneous liquid products possess effective foaming power and detergency in laundering, dishwashing and other cleansing operations. They are particularly economical in comparison to the use of an equivalent amount of alkali metal polyphosphates instead of silicate as the builder and have been found to exhibit comparable washing power within the range of about 10 to 20% inorganic builder salt. As a result, acceptable products may be prepared which contain said silicate as the sole or main inorganic builder salt and which are substantially free from polyphosphates therefore.

In the formulation of the products of the present invention, there are a number of factors which are of consideration as described. The properties are affected by such factors which are properly selected and correlated to provide the product hereafter claimed.

The alkali metal alkyl mononuclear aryl sulfonate detergent having about 8 to 15 carbon atoms in the alkyl group which it is preferred to use is alkyl benzene sulfonate, though other similar detergents having a mononuclear aryl nucleus, such as alkyl toluene and alkyl xylene sulfonates, may be used. The alkyl substituent may be branched such as nonyl, dodecyl and pentadecyl groups including mixtures thereof which are derived from polymers of lower mono-olefins. The alkyl group may be straight-chained in structure such as the n-decyl, keryl and dodecyl groups. Preferred examples of this class are the alkyl benzene sulfonates having an average of about 12 to 15 carbons in the alkyl group. These sulfonate detergents are used in the form of their water-soluble alkali metal salts such as the sodium or potassium salts. It is understood that there may be small amounts of inorganic salts such as sodium sulfate in the sulfonated detergent resulting from the method of manufacture. In general, these inorganic sulfate salts should be maintained at as low a concentration as practicable.

The sodium silicate salts employed having a sodium oxide to silica ratio selected from the range of about 1:1 to 1:2.5 are highly water-soluble and contribute improved detergency or washing power to the composition. Examples are sodium metasilicate having a 1:1 ratio and sodium silicates having a ratio of 1:1.6, 1:2.35 and 1:2.5 by weight. They may have varying amounts of water of hydration, but for convenience are indicated on an anhydrous basis. The metasilicate and the like are obtained usually as white crystalline compounds. The other silicates are commonly available in the form of concentrated solutions and proportions described herein are given on an anhydrous or silicate solids basis.

It is preferred to use the sodium silicates having a sodium oxide to silica ratio of about 1:1 to 1:2, preferably about 1:1.6, by weight since products containing these materials possess optimum cleansing power, stability and permit the widest variation in formulation. For example, more concentrated homogenous liquids having superior properties may be prepared with the use of these preferred sodium silicates as compared to the use of the more siliceous silicates.

The organic detergent and silicate salts are employed in substantial amounts such that the addition of a small portion of the liquid product to a washing bath will result in effective washing power. The proportions are variable and should be suitably selected so that there is formed a pourable, substantially homogeneous product in the aqueous solubilizing medium. As indicated, the amount of alkyl aryl sulfonate detergent is from the range of about 7 to 22% by weight and the sodium silicate solids is selected from the range of about 10 to 20% by weight, usually at least about 12%. As a general guiding principle, it is advisable to vary the detergent and silicate contents inversely, i.e., relatively low or medium amounts of one are used when relatively high amounts of the other are desired. For example, preferred compositions containing at least about 15% detergent should be formulated with sodium silicate in a compatible amount from up to about 15% by weight depending upon the particular silicate employed.

The presence of a water-soluble alkali metal sulfonated hydrotropic salt is effective in promoting the compatibility of the ingredients so as to form a homogeneous liquid product. Suitable materials are the alkali metal organic sulfonated (including sulfated) salts having a lower alkyl group up to about 6 carbons. It is preferred to employ an alkyl aryl sulfonate having up to 3 carbons in a lower alkyl group such as the sodium and potassium xylene, toluene, ethylbenzene and isopropybenzene sulfonates. Sulfonates made from xylene include orthoxylene sulfonate, metaxylene sulfonate, paraxylene sulfonate and ethylbenzene sulfonate. Commercial xylene sulfonates usually contain metaxylene sulfonate as the main ingredient. Analyses of typical commercial products show about 40–50% metaxylene sulfonate, 10–35% orthoxylene sulfonate and 15–30% paraxylene sulfonate with 0–20% ethylbenzene sulfonate. Any suitable isomeric mixture may be employed, however. Suitable lower alkyl sulfate salts having about 5 to 6 carbons in the alkyl group may be employed also, such as the alkali metal n-amyl and n-hexyl sulfates. The hydrotropic salts are employed generally in an amount from about 5 to 12% by weight. The use of an amount substantially in excess of the amount required to effect a single liquid phase with desired properties is not helpful since it tends to add additional salt to an already concentrated system.

It is preferred that at least the major amount of the detergent and hydrotropic salts be used in the form of the sodium salts so that the liquid contains essentially sodium cation, particularly for greater economy.

A further embodiment of the present invention relates to the inclusion of a minor amount of a water-soluble saturated aliphatic monohydric alcohol of 2 to 3 carbon atoms as part of the aqueous solubilizing medium. Examples are ethanol, propanol and isopropanol. The alcohol may serve a multiplicity of functions. It provides for improved physical properties such as a lower cloud point and better low temperature aging, lower viscosity and the like. In certain cases, a small amount of alcohol in combination with the hydrotropic salt will produce a clear liquid which will otherwise be cloudy. Thus, the combination of alcohol with the hydrotopic salt in said liquids tends to produce a desirable range of properties over wide temperature variations. The suitable amount of alcohol which may be employed varies with the particular formulation since an excessive amount tends to result in separation of the product into two or more phases, particularly at elevated temperatures. In general, the amount of alcohol employed is within the range of about ¼ to 5% by weight, preferably from about ½ to 4%, depending upon the effects desired.

It is preferred that the liquid contain a higher fatty acid alkylolamide material in a sufficient amount to act as a suds builder. The combination of the above ingredients with a suitable amount of the alkylolamide results in a product which exhibits high foaming power in use, particularly in the stability of the foam generated during dishwashing or laundering operations. In certain formulations, the alkylolamide may provide an additional solubilizing effect. It should not be employed in an excessive amount which destroys the desired physical properties such as by unduly raising the solids content. The acyl radical of the alkylolamide is selected from the class of fatty acids having 8 to 18 carbons, preferably 10 to 14 carbons, and each alkylol group has up to 3 carbon atoms usually. It is preferred to use the fatty acid isopropanolamides since they have been found to be more stable upon aging of the liquid products in comparison to other alkylolamides. The fatty acid diethanolamides and monoethanolamides may be employed also. Examples are the lauric, capric, myristic and coconut fatty acid diethanolamides, monoethanolamides and isopropanolamides, and mixtures thereof. There may be employed also the alkylolamides which are substituted by additional alkylol groups, suitable examples being the above monoethanolamides, diethanolamides and isopropanolamides condensed with one or two moles of ethylene oxide. In general, the alkylolamides should be employed in amounts of about 2 to 10%, and preferably from about 3 to 6% by weight.

The solids content of the concentrated liquid product is variable and usually up to about 52% by weight in the aqueous medium containing suitable proportions of solubilizing material. The balance of the composition is primarily water since the alcohol is used in small amounts. In general, the use of silicates having a greater silica content will require more water in the product than the more alkaline silicates having a lesser silica content. The total amount of water is usually at least about 45% by weight. It is understood that the amount of water will be suitably proportioned to provide sufficient solubilizing effects for the silicates and the other salts so as to form a substantially homogeneous liquid.

The liquid products are highly alkaline due primarily to the presence of the sodium silicate in solution. The products possess sufficient alkalinity to avoid precipitation of siliceous materials and to promote detergency. In general, the pH of the final liquid is usually at least about 11, and preferably at least about 12, depending upon the particular silicate used. In products formulated with silicates having a greater silica content and therefore usually less alkaline than those of a lesser silica content, it is preferred to add alkali during manufacture to raise the pH to a desired level, particularly if other ingredients are present normally tending to lower the pH of the liquid.

Various other ingredients may be added or substituted if desired. In a liquid containing a plurality of components, the individual solubility characteristics of added materials may influence the physical properties of the liquid. It is understood therefore that such ingredients will be suitably selected and the proportions of the various components controlled as described so as to form a liquid product having the desired physical qualities.

There may be included suitable amounts of various detergent materials. A suitable detergent which may be added or substituted in part for the alkyl aryl sulfonate detergent to improve detergency or modify the foaming properties is a water-soluble alkali metal higher alkyl phenoxy polyethoxamer sulfate. The alkyl group is selected from the range of 6 to 18 carbons preferably 8 to 13, and the polyethoxamer has an average of 2 to about 18 moles, preferably 4 to 10 moles, of ethylene oxide per mole of alkyl phenol. Suitable examples are the sodium and potassium salts of nonyl and dodecyl phenoxy polyethoxamer sulfate having an average of about 4 to 6 moles of ethylene oxide. It may be employed in any desired compatible amount, usually within the range of about 2 to 10% by weight, preferably about 3 to 7%. The ratio of alkyl aryl sulfonate to polyethoxamer sulfate is generally at least about 1:1 and preferably about 1.5:1 to 6:1, by weight for optimum performance characteristics.

Other ingredients which may be added as desired include compatible perfumes, coloring materials, corrosion or tarnish inhibitors, germicides, bleaching agents, optical bleaches or fluorescent dyes, viscosity modifiers or additional solvent materials, opacifying agents, foaming agents or cleansing improving agents, including small amounts of suitable water-soluble inorganic or organic builder salts provided that they do not adversely affect the homogeneous liquid product.

The liquid detergent product is prepared in any suitable manner. The hydrotropic salts and the organic detergent salts are added in any desired order in the form of powders, aqueous solutions or slurries to the aqueous medium. The alkylolamides are preferably added in molten or liquid form with agitation to form a homogeneous product. The alcohol may be added at any stage or in combination with the detergent. The silicates are added, preferably in the form of a concentrated aqueous solution, at any stage during the mixing operations. The temperature of admixture should be sufficient to dissolve or melt the ingredients and reasonably elevated temperature conditions such as up to about 140° F. may be employed as required.

The following examples are further illustrative of the nature of the present invention, and it will be understood that the invention is not limited thereto. All amounts indicated are in approximate weight percent.

*Example I*

Ingredients: Percent
    Sodium tridecyl benzene sulfonate _____ 18
    Sodium silicate (1:1.6, $Na_2O:SiO_2$) _____ 14
    Sodium xylene sulfonate (comm.) _____ 10
    Lauric-myristic isopropanolamide (70:30) ___ 3
    Ethanol _____ 2
    Water _____ Bal.

In the foregoing formulation, the higher alkyl benzene sulfonate is a commercial mixture of the propylene tetramer benzene sulfonate and propylene pentamer benzene sulfonate corresponding on the average to a tridecyl benzene sulfonate. It is listed above on an active ingredient basis, but the commercial material contains in addition about 10 to 15% sodium sulfate as a by-product, resulting from the manufacture and purification of the sulfonated detergent. The xylene sulfonate is specified on an active ingredient basis and comprises a mixture of meta-, para-, and ortho-xylene sulfonates with some toluene sulfonate. The sodium silicate is on a solids basis and is used in the form of an aqueous solution of about 50% solids. In the alkylolamide, the ratio of the lauric to myristic acyl groups is about 70:30 and the ethanol is S.D. 40 grade.

The liquid is prepared by adding some warm water to a crutcher, followed by the successive addition of the xylene sulfonate in the form of a powder, a small amount of fluorescent dye, the sulfonate detergent in the form of an aqueous slurry of about 46% solids, the alkylolamide in molten form, the alcohol and the silicate solution with stirring to form a homogeneous liquid at a final mixing temperature from about 105–120° F., after which it is cooled. Small amounts of color, perfume and opacifying agent, e.g., 0.16% polystyrene latex emulsion, are added to the product which has a pH of about 12.4.

This composition is a clear solution at room temperature in the absence of the added opacifying agent and exhibits satisfactory physical properties at 40° F. and 120° F. It has desirable foaming and cleansing properties in the washing of soiled textiles and utensils.

*Example II*

Ingredients: Percent
    Sodium tridecyl benzene sulfonate _____ 18
    Sodium silicate (1:1.6) _____ 10–15
    Sodium xylene sulfonate (commercial) ____ 9
    Coconut diethanolamide (commercial) _____ 3
    Ethanol _____ 3.5
    Water _____ Bal.

Clear liquids having satisfactory cleansing power are prepared according to the above formula using the sodium silicate in amounts of 10, and particularly 12, 13, 14 and 15% by weight. Upon sufficient cooling, they congeal but recover to clear liquids at temperatures from about 62–65° F. The products have satisfactory properties at elevated temperatures also.

*Example III*

The same formulation is employed as in Example II using 15% of said sodium silicate and increasing the xylene sulfonate to 11% with omission of the ethanol. The resulting product has satisfactory physical properties also.

*Examples IV–VI*

| Ingredients | Percent | | |
|---|---|---|---|
| | IV | V | VI |
| Sodium tridecyl benzene sulfonate | 10 | 9 | 10 |
| Sodium silicate (1:2.35) | 20 | 18 | |
| Sodium silicate (1:1) | | | 15 |
| Sodium xylene sulfonate (commercial) | 8.1 | 5.7 | 8 |
| Lauric-myristic diethanolamide (70:30) | 5 | 4.5 | 5 |
| Water | Bal. | Bal. | Bal. |

The foregoing products with relatively low amounts of detergent and relatively high amounts of silicate are clear homogeneous liquids at room temperature with satisfactory cleansing power.

*Examples VII–X*

| Ingredients | Percent | | | |
|---|---|---|---|---|
| | VII | VIII | IX | X |
| Sodium tridecyl benzene sulfonate | 18.3 | 20.2 | 18.3 | 16.6 |
| Sodium nonyl phenol-ethylene oxide sulfate (av. 5 m. EtO) | | | 3 | 5.5 |
| Sodium silicate (1:2) | 15.5 | 15.5 | 15.5 | 14 |
| Sodium xylene sulfonate (commercial) | 7.2 | 7.2 | 6.3 | 5.7 |
| Coconut diethanolamide (commercial) | 3 | 3 | | |
| Ethanol | 2 | 2 | 2 | 1.8 |
| Water | Bal. | Bal. | Bal. | Bal. |

The above products having relatively high amounts of detergent are clear liquids at room temperature with satisfactory cleansing power. The alcohol assists in maintaining the clarity of the solutions and low temperature aging characteristics are improved.

*Examples XI–XIII*

| Ingredients | Percent | | |
|---|---|---|---|
| | XI | XII | XIII |
| Sodium tridecyl benzene sulfonate | 18 | 18 | 16.2 |
| Sodium silicate (1:1.6) | 14 | | |
| Sodium silicate (1:2.35) | | 14 | |
| Sodium silicate (1:2.5) | | | 12.7 |
| Sodium xylene sulfonate (commercial) | 10 | 10 | 9 |
| Ethanol | 2 | 2 | 1.8 |
| Water | Bal. | Bal. | Bal. |

The foregoing formulations are clear liquids at room temperature with the product having the silicate of 1:1.6 possessing the best physical properties. The liquid of Example XI remains clear at elevated temperatures of about 120° F. The other products exhibit some separation into two liquid phases at 120° F., but return to a clear homogeneous liquid at room temperature. All of the products possess satisfactory washing power.

*Examples XIV–XVI*

| Ingredients | Percent | | |
|---|---|---|---|
| | XIV | XV | XVI |
| Sodium tridecyl benzene sulfonate | 8.7 | 8.5 | 7.8 |
| Sodium nonyl phenol-ethylene oxide sulfate (av. 5 moles EtO) | 5.8 | 5.7 | 5.2 |
| Sodium silicate (1:1.6) | 14.4 | | |
| Sodium silicate (1:2) | | 14.2 | |
| Sodium silicate (1:2.35) | | | 12.9 |
| Sodium xylene sulfonate (commercial) | 6.2 | 6.1 | 5.6 |
| Potassium toluene sulfonate (commercial) | 1.9 | 1.9 | 1.7 |
| Lauric-myristic diethanolamide (70:30) | 2.9 | 2.8 | 2.6 |
| Lauric-myristic isopropanolamide (70:30) | 2.9 | 2.8 | 2.6 |
| Water | Bal. | Bal. | Bal. |

The above products are clear liquids at room temperature with satisfactory washing power.

*Examples XVII–XVIII*

| Ingredients | Percent | |
|---|---|---|
| | XVII | XVIII |
| Potassium tridecyl benzene sulfonate | 9.4 | |
| Potassium dodecyl benzene sulfonate | | 9.4 |
| Sodium nonyl phenol-ethylene oxide sulfate (av. 5 moles EtO) | 6 | 6 |
| Sodium silicate (1:1) | 15 | |
| Sodium silicate (1:1.6) | | 15 |
| Sodium xylene sulfonate (commercial) | 8.35 | |
| Potassium xylene sulfonate (commercial) | 0.5 | 9.5 |
| Lauric-myristic diethanolamide (70:30) | 3 | 3 |
| Lauric-myristic isopropanolamide (70:30) | 3 | 3 |
| Water | Bal. | Bal. |

The above products have a pH above 11 and are clear liquids at room temperature with cloud points below 40° F., and possess satisfactory washing power also. The silicate of Example XVIII is a mixture of sodium metasilicate (1:1 ratio) and silicate having a 1:2.5 ratio which averages to a ratio of 1:1.6 of sodium oxide to silica.

Although the present invention has been described with reference to particular embodiments and examples, it will be apparent to those skilled in the art that variations and modifications to this invention can be made and equivalents can be substituted therefor without departing from the principles and true spirit of the invention.

Having thus described the invention, what is claimed is:

1. A liquid detergent composition substantially free from inorganic polyphosphate salts and effective as a heavy-duty detergent consisting essentially of about 7 to 22% by weight of alkali metal alkyl mononuclear aryl sulfonate detergent having an alkyl group of 8 to 15 carbon atoms, a proportion within the range of about 10 to 20% by weight of sodium silicate solids having a sodium oxide to silica ratio of about 1:1 to 1:2.5 by weight, effective as an inorganic builder salt sufficient to exhibit heavy-duty detergency in combintaion therewith and in the absence of said polyphosphates, about 5 to 12% by weight of an alkali metal organic hydrotropic salt selected from the group consisting of sodium and potassium salts of xylene, toluene, ethylbenzene and isopropylbenzene sulfonate, n-amyl and n-hexyl sulfate, and mixtures thereof, and the balance being primarily water, said detergent composition forming a pourable, homogeneous liquid composition having a total solids content up to about 52% by weight and a pH of at least about 11.

2. A liquid detergent composition substantially free from inorganic polyphosphate salts consisting essentially of about 7 to 22% by weight of alkali metal alkyl benzene sulfonate detergent having an alkyl group of 8 to 15 carbon atoms, about 12 to 20% by weight of sodium silicate solids having a sodium oxide to silica ratio from about 1:1 to 1:2, effective as an inorganic builder salt sufficient to exhibit heavy-duty detergency in combination therewith in the absence of said polyphosphates, about 5 to 12% by weight of an alkali metal organic hydrotropic salt selected from the group consisting of sodium and potassium xylene and toluene sulfonates, and the balance being primarily water, said detergent composition forming a pourable, homogeneous liquid composition having a total solids content up to about 52% by weight and a pH of at least about 11.

3. A liquid detergent composition in accordance with claim 2 which contains about ¼ to 5% by weight of a saturated aliphatic monohydric alcohol of 2 to 3 carbon atoms.

4. A liquid detergent composition in accordance with claim 2 which contains about 3 to 6% by weight of a higher fatty acid alkylolamide having 8 to 18 carbons in the acyl radical and 2 to 3 carbons in each alkylol group.

5. A liquid detergent composition in accordance with claim 2 which contains about 3 to 7% by weight of an alkali metal higher alkyl phenoxy polyethoxamer sulfate, the alkyl group having 6 to 18 carbons and the polyethoxamer having an average of 2 to 18 moles of ethylene oxide.

6. A liquid detergent composition substantially free from inorganic polyphosphate salts consisting essentially of about 7 to 22% by weight of alkali metal alkyl benzene sulfonate detergent having an alkyl group of 8 to 15 carbon atoms, a proportion within the range of about 10 to 20% by weight of sodium silicate solids having a sodium oxide to silica ratio from about 1:1 to 1:2 by weight, effective as an inorganic builder salt sufficient to exhibit heavy-duty detergency in combination therewith and in the absence of said polyphosphates, about 5 to 12% by weight of an alkali metal organic hydrotropic salt selected from the group consisting of sodium and potassium salts of xylene, toluene, ethylbenzene and isopropylbenzene sulfonate, n-amyl and n-hexyl sulfate, and mixtures thereof, about 3 to 6% by weight of higher fatty acid alkylolamide having 10 to 14 carbons in the acyl radical and 2 to 3 carbons in each alkylol group, about ½ to 4% by weight of a saturated aliphatic monohydric alcohol having 2 to 3 carbons in water, said ingredients forming a pourable, homogeneous liquid composition having a total solids contents up to about 52% by weight and a pH of at least about 11.

7. A liquid detergent composition substantially free from inorganic polyphosphate salts consisting essentially of about 15 to 20% by weight of alkali metal alkyl benzene sulfonate detergent having an alkyl group of 8 to 15 carbon atoms, about 12 to 15% by weight of sodium silicate having a sodium oxide to silica ratio from about 1:1 to 1:2 by weight, about 5 to 12% by weight of an alkali metal organic hydrotropic salt selected from the group consisting of sodium and potassium xylene and toluene sulfonates, about ¼ to 5% by weight of a saturated aliphatic monohydric alcohol of 2 to 3 carbon atoms in water, said ingredients forming a pourable, homogeneous liquid composition having a total solids content up to about 52% by weight and a pH of at least about 11.

8. A liquid detergent composition substantially free from inorganic polyphosphate salts which consists essentially of about 15 of 20% by weight of sodium alkyl benzene sulfonate detergent having an alkyl group averaging about 12 to 15 carbon atoms, about 10 to 15% by weight of sodium silicate having a sodium oxide to silica ratio from about 1:1 to 1:2 by weight, about 5 to 12% by weight of an alkali metal organic hydrotropic salt selected from the group consisting of sodium and potassium xylene and toluene sulfonates, about 3 to 6% by weight of higher fatty acid alkylolamide selected from the group consisting of isopropanolamides, diethanolamides and monoethanolamides of fatty acids having about 10 to 14 carbon atoms in the acyl radical, and about ½ to 4% by weight of ethanol in water, said composition having a total solids content up to about 52% by weight and a pH of at least about 11, said ingredients forming a pourable, clear liquid composition at room temperature.

9. A liquid detergent composition in accordance with claim 8 wherein said sodium silicate has a sodium oxide to silica ratio of about 1:1.6 by weight.

(References on following page)

References Cited by the Examiner

UNITED STATES PATENTS

| | | | |
|---|---|---|---|
| 2,859,182 | 11/1958 | Carroll | 252—137 |
| 2,877,185 | 3/1959 | Krumrei et al. | 252—137 |
| 2,877,187 | 3/1959 | Henderson et al. | 252—153 |
| 3,150,098 | 9/1964 | Wilson | 252—152 |
| 3,168,478 | 2/1965 | Stefcik et al. | 252—135 |

FOREIGN PATENTS 669,081   3/1952   Great Britain.

LEON D. ROSDOL, *Primary Examiner.*

JULIUS GREENWALD, *Examiner.*

A. T. MEYERS, *Assistant Examiner.*